(12) United States Patent
Beardmore et al.

(10) Patent No.: US 11,572,908 B2
(45) Date of Patent: *Feb. 7, 2023

(54) CAPTIVE FASTENER WITH FLOATING BOLT

(71) Applicant: Harcourt Industrial, Inc., Madison Heights, MI (US)

(72) Inventors: Robert Beardmore, Rochester Hills, MI (US); Kyle Beardmore, Rochester Hills, MI (US)

(73) Assignee: HARCOURT INDUSTRIAL, INC., Madison Heights, MI (US)

( * ) Notice: Subject to any disclaimer, the term of this patent is extended or adjusted under 35 U.S.C. 154(b) by 71 days.

This patent is subject to a terminal disclaimer.

(21) Appl. No.: 15/968,602

(22) Filed: May 1, 2018

(65) Prior Publication Data
US 2019/0032689 A1 Jan. 31, 2019

Related U.S. Application Data

(60) Provisional application No. 62/537,439, filed on Jul. 26, 2017.

(51) Int. Cl.
*F16B 41/00* (2006.01)
*F16B 5/02* (2006.01)
*F16B 35/06* (2006.01)
*F16B 21/07* (2006.01)

(52) U.S. Cl.
CPC .......... *F16B 5/0208* (2013.01); *F16B 41/002* (2013.01); *F16B 21/073* (2013.01); *F16B 35/06* (2013.01)

(58) Field of Classification Search
CPC ...... F16B 41/002; F16B 41/00; F16B 5/0208; F16B 35/041; F16B 21/08; F16B 37/0871; F16B 5/0225; F16B 5/025
USPC ........................................................ 411/353
See application file for complete search history.

(56) References Cited

U.S. PATENT DOCUMENTS

| | | | | |
|---|---|---|---|---|
| 3,346,032 A | * | 10/1967 | Gulistan | F16B 41/002 411/349 |
| 3,571,904 A | * | 3/1971 | Gulistan | F16B 41/00 29/443 |
| 3,614,799 A | * | 10/1971 | Gulistan | F16B 41/002 470/50 |

(Continued)

OTHER PUBLICATIONS

Oberg et al., Machinery's Handbook, Published in 2012 by Industrial Press (New York), 29th edition p. 1609 (Year: 2012).*

(Continued)

*Primary Examiner* — Flemming Saether
(74) *Attorney, Agent, or Firm* — William H. Honaker; Dickinson Wright PLLC

(57) ABSTRACT

A captive fastener including a bushing having a body portion and an internal bore extending through the body portion A snap ring is mounted within the internal bore. A fastener having an elongated shaft is mounted within the bore and is adapted to reciprocate within the bore between retracted and extended positions. The elongated shaft has a shank diameter and threads formed on one end of the fastener. The snap ring engages the bolt when the shaft is extended and retracted. The fastener has a shank diameter which is 0.020 inches to 0.060 inches shorter than the bore diameter so that the fastener can be moved laterally within the bore.

2 Claims, 3 Drawing Sheets

(56) References Cited

U.S. PATENT DOCUMENTS

| 4,934,888 | A | * | 6/1990 | Corsmeier | F16B 41/002 |
| | | | | | 411/107 |
| 2012/0237315 | A1 | * | 9/2012 | Chiu | F16B 5/0208 |
| | | | | | 411/171 |
| 2014/0064876 | A1 | * | 3/2014 | Tseng | F16B 5/0208 |
| | | | | | 411/147 |
| 2015/0267730 | A1 | * | 9/2015 | He | F16B 5/0208 |
| | | | | | 411/352 |
| 2018/0274573 | A1 | * | 9/2018 | Frost | F16B 5/0208 |

OTHER PUBLICATIONS

Slotted Locator Bushings, Jergens Manufacturing, Nov. 16, 2016, <https://web.archive.org/web/20161116040546/http://www.jergensinc.com/Press-Fit-Slotted-Locator-Bushing> (Year: 2016).*

* cited by examiner

CAPTIVE FASTENER WITH FLOATING BOLT

CROSS-REFERENCE TO RELATED APPLICATIONS

This application claims the benefit of U.S. Provisional Application Ser. No. 62/537,439, filed Jul. 26, 2017, which is incorporated herein by reference in its entirety.

STATEMENT REGARDING FEDERALLY SPONSORED RESEARCH

NONE.

TECHNICAL FIELD

This invention relates generally to captive fasteners and more particularly to an improved captive fastener with a floating bolt.

BACKGROUND OF THE INVENTION

Captive fasteners are well known in the manufacturing industry. A captive fastener is typically a fastener that is held in a bushing to prevent the fastener from being inadvertently removed from the bushing. The fastener can reciprocate within the bushing between a fastened position and unfastened position. The purpose is to keep the fastener attached to the bushing so that it is not lost. The bushing is mounted for example to a first work surface in a manner to prevent unintended removal. The bushing could be pressed in, threaded, deformed, or mounted with a secondary fastener such as a locking screw. Many captive fasteners use thread locking, press-fitting, or broaching to accomplish their anchor-hold within the larger assembly housing. However, some captive fasteners meld with the material into which they are joined, either through cold forming or welding.

The fastener is intended to be fastened to a second work surface by pushing the fastener into the bushing and then fastening the fastener to a receiver in or adjacent the second work surface. The fastener and receiver can take many forms, for example, it could be a t-fastener which fits in a slotted fastener, a threaded end that is threaded into a nut, etc. Captive fasteners are designed for permanent retention within their target assembly or housing providing a secure joint and avoiding loss or damage that might be caused by a loose part.

Typical captive fasteners have the bolt or shaft tightly received within the longitudinal opening in the bushing. There is no play between the fastener and the bushing. The fastener is free to reciprocate longitudinally with respect to the bushing, but cannot move laterally with respect to the bushing.

A major problem with captive fasteners and in particular threaded fasteners is that the fastener has to be carefully and accurately aligned with the receiver since the fastener cannot be adjusted laterally with respect to the receiver. If the fastener and receiver are misaligned even slightly, the fastener cannot be properly inserted into the receiver. With several captive fasteners in a single workpiece, this problem becomes even more acute. To align the fasteners properly, the workpiece must be realigned, which slows the operation.

The problem is greatest with threaded fasteners since the external threads of the fastener must align with the internal threads of the receiver. If they are misaligned, the threads can bind.

SUMMARY OF THE INVENTION

In general terms, this invention provides an improved captive fastener that better ensures that the fastener, particularly a threaded fastener is aligned with the receiver.

These and other features and advantages of this invention will become more apparent to those skilled in the art from the detailed description of a preferred embodiment. The drawings that accompany the detailed description are described below.

DETAILED DESCRIPTION OF A PREFERRED EMBODIMENT

Figure 1:
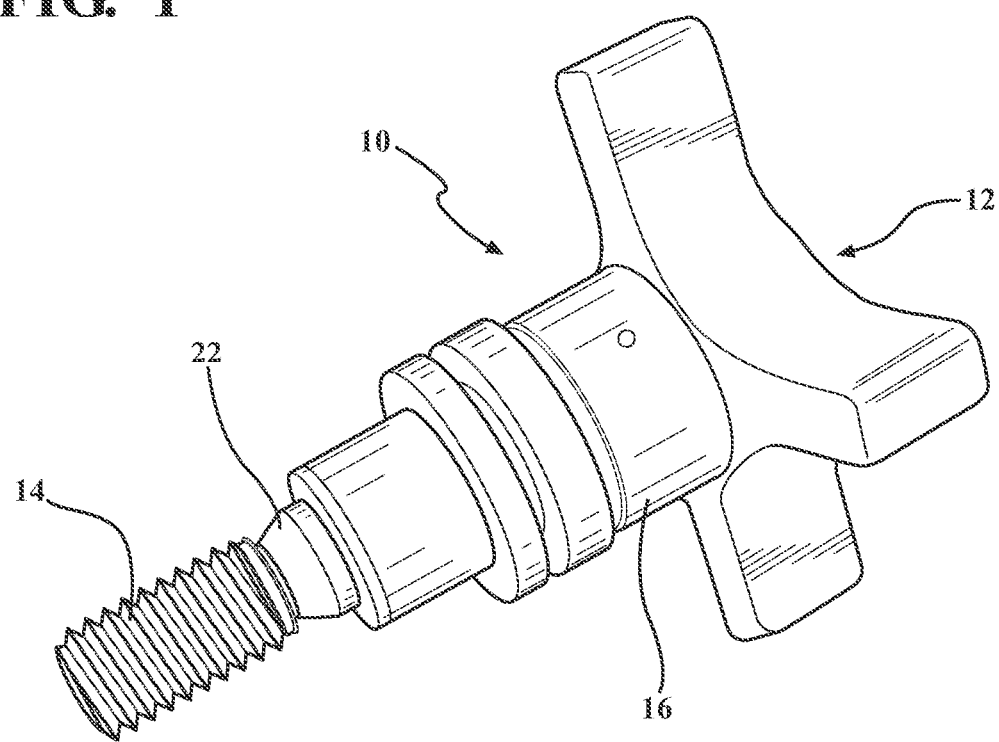
FIG. 1 is a perspective view of the captive fastener of the present invention.

A captive fastener of the present invention is shown generally at 10 in FIG. 1. A captive bolt fastener is illustrated, but those of ordinary skill in the art will appreciate that any other type of captive fastener will benefit from the present invention.

Typically, captive fasteners 10 are used for repeatedly attaching one workpiece or template to another. Because of the repetitive nature of attaching and removing the fasteners, they are left in bushings that are fixed to one of the work pieces. The purpose of the captive fastener is to keep the fastener in the bushing so that it is not lost.

The captive fastener 10 of the present invention has a handle 12 which is connected to a bolt 14. In the disclosed embodiment the handle 12 is fastened to the bolt 14 with a set screw. It will be appreciated that any number of common fastening methods could be used, such as for example, welding, soldering, integral formation, etc. Additionally, other handles could be used, such as a t-handle, any of the multitude of screw drive types, such as hex heads, hex sockets, allen wrench sockets, slotted, phillips head, etc.

The bolt 14 is threaded at 15. The end 15 is adapted to be received by a complementary receiver 11 attached or associated with a workpiece or pickup to which the primary workpiece or template is to be attached. The receiver 11 in the disclosed embodiment is an internally threaded nut. The captive fastener 10 includes a captive bushing 16 that is adapted to allow the bolt 14 to reciprocate within the bushing 16 for fastening and unfastening and be fixed to the primary work surface. Various methods can be used to fix the bushing 16 to the workpiece, for example, it can be press fit, welded, deformed into the metal for more permanent applications or as illustrated, a lock screw 17 can be used to attach the bushing 16 to the workpiece.

Figure 2:
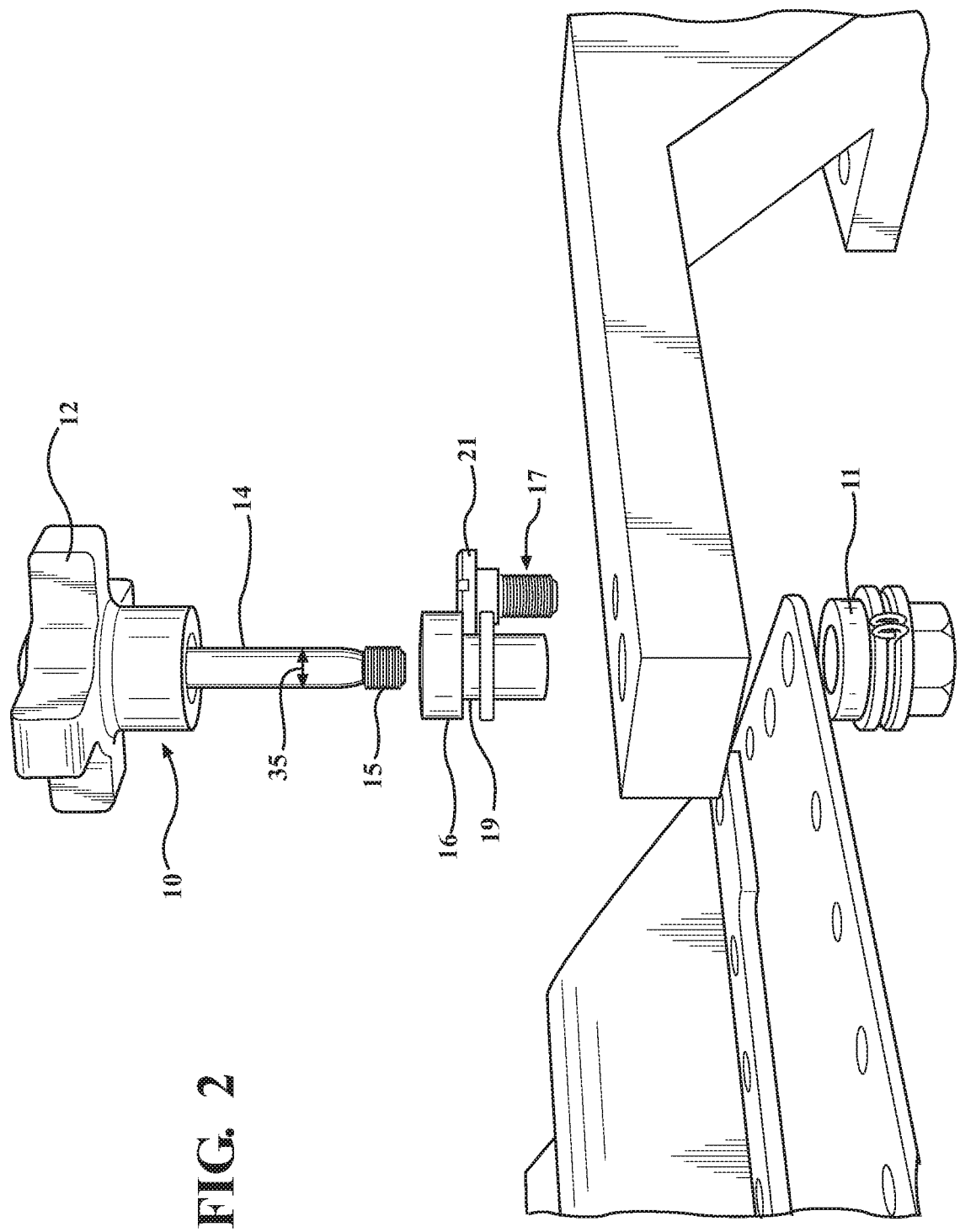
FIG. 2 is a perspective view of the captive fastener of the present invention illustrating an example of how the captive fastener is used.

With reference to FIG. 2, the illustrated captive fastener 10 is connected to the workpiece by a lock screw 17. The captive bushing has a circumferential groove 19 for receipt of the head 21 of the lock screw. As is known, the lock screw 17 is threaded into an adjacent opening in the work piece or pickup with the head 21 of the screw being partially received in the circumferential groove 19 on the bushing.

The bushing 16 includes an internal snap ring (not shown) mounted within a channel in the interior of the bushing 16. The channel is near the proximal end of the bushing 16 away from the threads 15. The fastener 14 has a sloped section 22 that slopes from the shaft of the fastener 14 downwardly towards the threads. The sloped section 22 allows the fastener 14 to be moved between the retracted and extended positions more easily.

Figure 3:
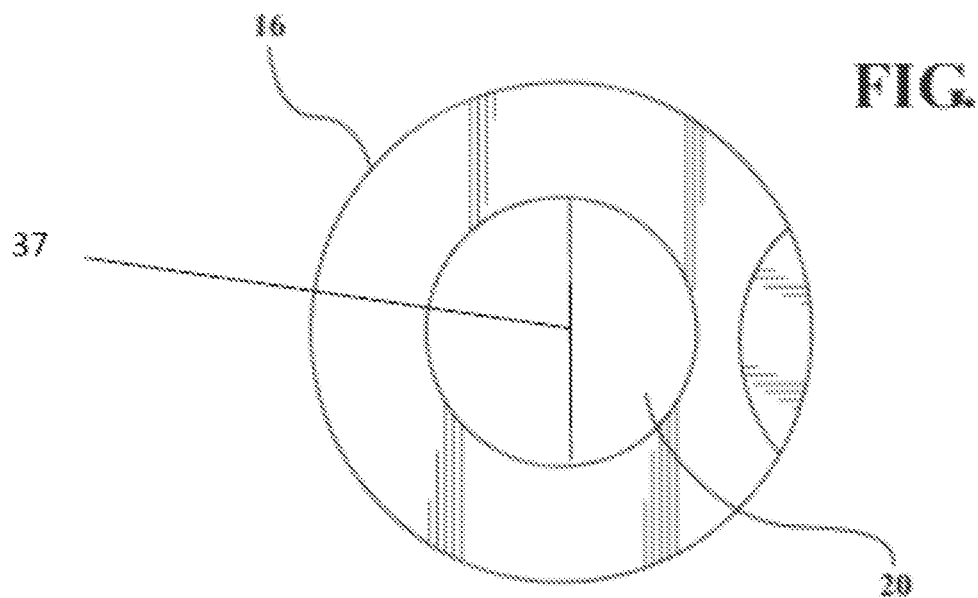
FIG. 3 is a top view of the longitudinal opening in the bushing for receipt of the bolt.
Figure 4:
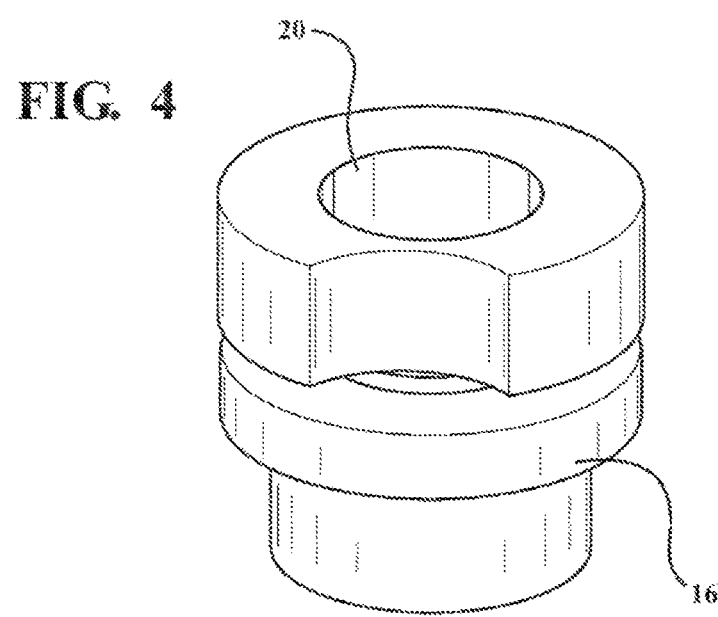
FIG. 4 is a perspective view of the longitudinal opening in the bushing for receipt of the bolt.

With reference to FIGS. 3 and 4, the longitudinal opening 20 is illustrated. The longitudinal opening 20 receives the bolt 14. The bolt 14 has a shank diameter 35 that is loosely positioned in the opening 20 that has a diameter 37 so that bolt 14 can float or move laterally within opening 20. The opening diameter 37 is approximately 0.020 inches to 0.060 inches wider than the shank diameter 35 of bolt 14 and in the preferred embodiment, the opening diameter 37 is approximately 0.040 inches wider than the shank diameter of bolt 14. Due to the wider opening, the bolt can be moved laterally to align with the receiver.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. A captive fastener comprising:
   a bushing having a body portion for attachment to a first work surface;
   an internal bore extending through said body portion, said internal bore having a bore diameter;
   a circumferential groove formed in said bushing;
   a lock screw with a head portion, said lock screw is adapted to be threaded into the first work surface with said head portion of said screw being partially received in the circumferential groove on said bushing to retain said bushing on the first work surface;
   a fastener having an elongated shaft, said elongated shaft is mounted within said bore and adapted to reciprocate within said bore between retracted and extended positions;
   said elongated shaft having a shank diameter;
   threads formed on one end of said fastener; said threads having a thread diameter equal to said shank diameter whereby said fastener can be reciprocated within said bushing;
   said fastener having a shank diameter which is 0.050 inches to 0.060 inches shorter than said bore diameter;
   a receiver adapted to be mounted to a second work surface, said fastener being moved laterally to align with said receiver;
   whereby said fastener can be moved laterally within said bore to align with said receiver.

2. The captive fastener of claim 1, further including a sloped section on said shaft extending from a space distance above said threads, said sloped section having a first diameter equal to said shank diameter and tapering to a second smaller diameter adjacent said threads.

\* \* \* \* \*